(12) United States Patent
Kimura et al.

(10) Patent No.: US 7,730,721 B2
(45) Date of Patent: Jun. 8, 2010

(54) EXHAUST GAS PURIFICATION DEVICE OF INTERNAL COMBUSTION ENGINE

(75) Inventors: Hiroyuki Kimura, Obu (JP); Mitsutaka Kojima, Okazaki (JP); Kojiro Okada, Nagoya (JP); Kei Shigahara, Anjo (JP); Michihiro Hata, Okazaki (JP); Kazuhito Kawashima, Okazaki (JP); Kazuo Koga, Okazaki (JP); Kazuto Maehara, Anjo (JP); Hajime Ishii, Okazaki (JP)

(73) Assignees: Mitsubishi Jidosha Kogyo Kabushiki Kaisha, Tokyo (JP); Mitsubishi Jidosha Engineering Kabushiki Kaisha, Aichi (JP)

( * ) Notice: Subject to any disclaimer, the term of this patent is extended or adjusted under 35 U.S.C. 154(b) by 0 days.

(21) Appl. No.: 12/267,294

(22) Filed: Nov. 7, 2008

(65) Prior Publication Data
US 2009/0158717 A1 Jun. 25, 2009

(30) Foreign Application Priority Data
Dec. 25, 2007 (JP) ............................. 2007-332381

(51) Int. Cl.
*F01N 3/00* (2006.01)
(52) U.S. Cl. .............................. 60/286; 60/295; 60/297; 60/303; 60/324
(58) Field of Classification Search .................. 60/286, 60/295, 301, 303, 297, 323, 324
See application file for complete search history.

(56) References Cited

U.S. PATENT DOCUMENTS

| | | | |
|---|---|---|---|
| 2005/0013756 A1* | 1/2005 | Amou et al. | 423/239.1 |
| 2008/0134671 A1* | 6/2008 | Nefischer | 60/300 |
| 2008/0155973 A1* | 7/2008 | Maruyama et al. | 60/299 |
| 2009/0084094 A1* | 4/2009 | Goss et al. | 60/301 |

FOREIGN PATENT DOCUMENTS

| | | |
|---|---|---|
| JP | 2002-514495 A | 5/2002 |
| JP | 2003-13729 A | 1/2003 |
| JP | 2004-44483 A | 2/2004 |
| JP | 2004-353523 A | 12/2004 |
| JP | 2006-77691 A | 3/2006 |
| JP | 2007-146700 A | 6/2007 |

* cited by examiner

*Primary Examiner*—Binh Q Tran
(74) *Attorney, Agent, or Firm*—Birch, Stewart, Kolasch & Birch, LLP

(57) ABSTRACT

The exhaust gas purification device of an internal combustion engine of the present invention comprises an exhaust passage for guiding an exhaust gas exhausted from an engine to outside, a catalyst provided in the exhaust passage, an injection path connected on an upstream side of the catalyst in the exhaust passage, an additive injection valve installed in the injection path for supplying an additive to the catalyst through the injection path, and an inflow portion provided in a merging portion where the exhaust passage and the injection path merge for having a part of the exhaust gas flowing in the exhaust passage flow into the injection path.

7 Claims, 12 Drawing Sheets

EXHAUST GAS PURIFICATION DEVICE OF INTERNAL COMBUSTION ENGINE

BACKGROUND OF THE INVENTION

1. Field of the Invention

The present invention relates to an exhaust gas purification device of an internal combustion engine having a structure for injecting an additive to be supplied to a catalyst.

2. Description of the Prior Art

For purification of an exhaust gas of a diesel engine vehicle (vehicle), in order to prevent emission of NOx (nitrogen oxides) and PM (particulate matter) contained in exhaust gas of a diesel engine into the air, an exhaust gas purification device in which NOx trap catalyst, selective reduction NOx catalyst, diesel particulate filter and the like are combined is used.

In this type of an exhaust gas purification device, such a structure is employed that in an exhaust passage for exhausting an exhaust gas exhausted from an engine to the outside, an oxidation catalyst, a NOx trap catalyst, a selective reduction NOx catalyst and the like called pre-stage catalyst is provided, and on an upstream side of the catalyst or an upstream side of the oxidation catalyst, for example, a fuel addition valve (to add a reducing agent) for injecting a fuel as an additive required for reaction of the catalyst is provided.

In order to have the fuel addition valve function normally all the time, it is required to avoid use of the fuel addition valve exceeding a heat-resistant temperature or generation of deposit at a distal end portion of the fuel addition valve causing clogging of injection.

Therefore, it is effective to keep the fuel addition valve away from an exhaust gas flow so as not to have the distal end portion injecting the fuel exposed to a high-temperature exhaust gas. An exhaust gas purification device disclosed in Japanese Patent Laid Open No. 2004-44483 is configured such that a fuel injection path branched from the exhaust passage and extended is provided at the exhaust passage and the fuel addition valve is installed at a distal end portion of the fuel injection path so that the fuel of the fuel addition valve is injected from a point far from the exhaust gas into the exhaust passage through the fuel injection path.

Since in such a structure that the fuel is injected from a point far from the exhaust gas flow, the fuel injection path is retreated from the exhaust passage, a flow of the exhaust gas flowing through the exhaust passage is hard to reach the inside of the fuel injection path. That is, since a stagnated portion easily occurs in the fuel injection path, the fuel evaporated in the fuel injection path can easily collect in the fuel injection path.

The evaporated fuel accumulated in the fuel injection path becomes a binder to have soot contained in the exhaust gas adhere to a wall surface of the fuel injection path and generate a deposit. Since the deposit is accumulated on the wall surface of the fuel injection path every time the fuel is injected, there is a possibility that the fuel injection path is blocked by the accumulated deposit.

SUMMARY OF THE INVENTION

The present invention was made in view of the above circumstances and has an object to provide an exhaust gas purification device of internal combustion engine that suppresses generation of a deposit of an additive in an injection path.

The exhaust gas purification device of internal combustion engine according to the present invention is provided with an exhaust passage for guiding an exhaust gas exhausted from an engine to the outside, a catalyst provided at the exhaust passage, an injection path connected to an upstream side of the catalyst in the exhaust passage, an additive injection valve for supplying an additive to the catalyst through the injection path, and an inflow portion provided in a merging portion where said exhaust passage and said injection path merge for having a part of the exhaust gas flowing into the exhaust passage flow into the injection path.

According to the exhaust gas purification device configured as above, by inflow of the exhaust gas into the injection path, stagnation of the additive or soot in the injection path is reduced, and generation of deposits in the injection path can be suppressed. As a result, the additive can be injected form the additive addition valve favorably all the time, and the exhaust gas purification performance can be maintained favorably all the time.

In a preferred aspect of the present invention, the inflow portion is provided with an inflow path for having a part of the exhaust gas flowing in the exhaust passage flow into the injection path and a scavenging flow forming means for changing a flow of the exhaust gas having flown into the injection path from the inflow path to a flow scavenging inside the injection path. Thereby, scavenging in the injection path can be effectively carried out.

Also, in another preferred aspect of the present invention, the inflow portion is formed with a corner part formed by the injection path and a portion on an upstream side of a portion to which the injection path in the exhaust passage is connected is expanded outward. Thereby, when the exhaust passage and the injection path are to be manufactured, the inflow portion can be realized only by changing the shapes of the exhaust passage and the injection path.

In still another aspect of the present invention, the inflow portion is an introduction pipe member with one end connected to the injection path and the other end connected to a portion on the upstream side portion of the injection path in the exhaust passage. Therefore, without largely changing the shape of the exhaust passage, by providing the introduction pipe member, the inflow path can be realized.

The scavenging flow forming means is, in a preferred aspect of the present invention, provided with a collision portion where the exhaust gas introduced from the inflow path collides against the wall surface of the injection path and is configured so that the inside of the injection path is scavenged by the flow of the exhaust gas generated by the collision. Thereby, the scavenging in the injection path can be effectively carried out with a simple structure.

Also, the scavenging flow forming means has, in another preferred aspect of the present invention, the inflow path opened in the injection path with offset to an axis of the injection path so that a swirl flow of the exhaust gas is generated in the injection path, and the inside of the injection path is scavenged by the swirl flow. Thereby, the inside of the injection path can be effectively scavenged also by a simple structure.

In another preferred aspect of the present invention, the exhaust passage has a bent portion, and the injection path extends outward in the middle of the bent portion in the exhaust passage. Thereby, a structure for scavenging easily in the injection path utilizing a fork portion formed by the injection path of the additive and the bent portion can be constructed.

Also, in another preferred aspect of the present invention, the injection path is formed by a pipe member provided separately from the exhaust passage and having its distal end portion projecting into the exhaust passage, and the inflow portion is formed at the distal end of the pipe member and is a notched portion for receiving a part of the exhaust gas flowing in the exhaust passage. Thereby, with a simple structure using a pipe member in which a notched portion is formed at the distal end portion, the scavenging in the injection path of the additive can be carried out.

The notched portion is formed by diagonally notching the distal end portion of the pipe member in the preferred aspect so as to have an introduction portion for receiving a part of the exhaust gas flowing in the exhaust passage. Thereby, with a simple structure, the scavenging in the injection path of the additive can be carried out.

Also, the notched portion in another preferred aspect is a slit formed on a wall portion of the pipe member, extending in a direction of a shaft core, so that a part of the exhaust gas flowing in the exhaust passage flows into the inside of the pipe member from the slit. Thereby, the scavenging in the injection path of the additive can be carried out.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirits and scope of the invention will become apparent to those skilled in the art from this detailed description.

BRIEF DESCRIPTION OF THE DRAWING

The present invention will become more fully understood from the detailed description given hereinbelow and the accompanying drawings which are given by way of illustration only, and thus, are not limitative of the present invention, and wherein.

DETAILED DESCRIPTION OF THE INVENTION

The present invention will be described below on the basis of a first embodiment illustrated in FIGS. 1 to 5.

Figure 1:
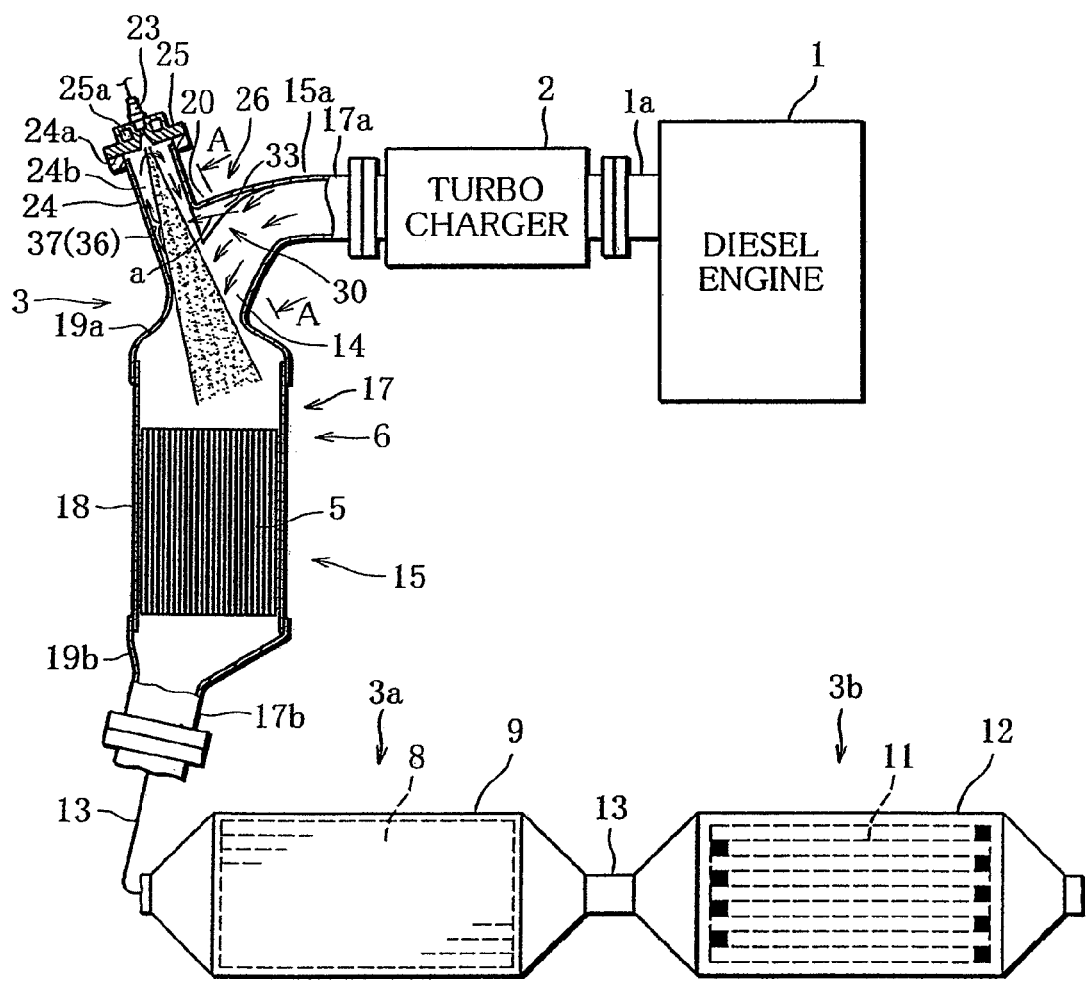
FIG. 1 is a side view illustrating an entire exhaust gas purification device according to a first embodiment of the present invention.

FIG. 1 shows an exhaust system of internal combustion engine such as a diesel engine, for example. Reference numeral 1 in the figure denotes an engine main body in a diesel engine, 1a to an exhaust manifold (only a part of it is shown) of the engine main body 1, and 2 to a turbo charger connected to an outlet of the exhaust manifold 1a, respectively.

At an exhaust outlet of the turbo charger 2, an exhaust gas purification device 3 is provided. In the exhaust gas purification device 3, a structure in which a NOx removing system 3a for storing NOx (nitrogen oxides) in the exhaust gas and regularly reducing and removing the stored NOx and a PM trap system 3b for trapping PM (particulate matter) are combined is used.

For example, in the NOx removing system 3a, configuration in which a catalyst converter 6 connected to the exhaust outlet of the turbo charger 2, extending downward, and incorporating an oxidation catalyst 5 to be a pre-stage catalyst, a catalyst converter 9 connected laterally to the rear of the catalyst converter 6 and incorporating a NOx trap catalyst 8, and a fuel addition valve (additive injection valve) 23 for supplying a fuel for catalyst reaction, which is an additive as will be described later, are combined is used. In the trap system 3b, configuration in which a catalyst converter 12 incorporating a particulate filter 11 is connected to the catalyst converter 9 is used. These catalyst converters 6, 9, 12 and a connection portion 13 connecting the converters to each other constitute an exhaust passage 15 for guiding an exhaust gas exhausted from the engine main body 1 of the diesel engine to the outside.

A vertical cylindrical housing 17 containing the oxidation catalyst 5 of the catalyst converter 6 is constituted by mounting an inlet body 19a and an outlet body 19b at both end portions of a cylindrical barrel portion 18. The inlet body 19a on an upper side, for example, is molded substantially in the L-shape and has an inlet portion 17a connected to the turbo charger 2 arranged laterally. The outlet body 19b on the lower side projects downward and has an outlet portion 17b communicating with the catalyst converter 9 arranged downward. In order to contain the exhaust gas purification device 3 in an engine room (not shown) of a vehicle at a point immediately downstream of the exhaust side of the diesel engine in the exhaust passage 15 by the housing 17, a bent portion 15a bent in the L-shape is formed. That is, a space for installing a catalyst is ensured by a barrel portion 18 arranged downward from the bent portion 15a. The oxidation catalyst 5 is installed in the barrel portion 18 arranged immediately below the bent portion 15a.

The fuel addition valve 23 is provided, in order to inject a fuel required for the catalyst reaction to the oxidation catalyst 5, at a point immediately above the oxidation catalyst 5 such as on an outer circumference side of the bent portion 15a, for example, in order to avoid restriction in space. The fuel addition valve 23 has a fuel injection portion for injecting a fuel at a distal end portion. From the outer circumference portion on the outlet side of the bent portion 15a (bent exhaust passage portion), a cylindrical portion 24 is branched extending in a direction away from the bent portion 15a, that is, outward. The fuel addition valve 23 is installed at a distal end portion of the cylindrical portion 24 branched from the middle of the bent portion 15a using a mounting flange 24a and a base 25. Thereby, the fuel injection portion at the distal end portion of the fuel addition valve 23 is faced with a fuel injection path 24b as an additive injection path formed by an internal space of the cylindrical portion 24. The fuel injection path 24b is inclined to the side opposite to a bent direction of the bent portion 15a, and the fuel injection path 24b is directed to an inlet end face of the oxidation catalyst 5. Thereby, the fuel required for the catalyst reaction is injected toward the oxidation catalyst 5 from a point far from the exhaust gas flow. Reference numeral 25a denotes a cooling water path formed inside the base 25.

In the structure of the injection system, a point forming a merging portion 26 where the fuel injection path 24 and the exhaust passage 15 merge, that is, between a base end of the fuel injection path 24b and a portion 15b of the exhaust passage 15 rising while bending immediately upstream side of that, an inflow portion 30 is provided. The inflow portion 30 scavenges the inside of the fuel injection path 24b with a part of the exhaust gas flowing in the bent portion 15a. Sections of each part of the inflow portion 30 are shown in FIGS. 2 and 3, and appearances of each part of the inflow portion 30 are shown in FIGS. 4 and 5.

The inflow portion 30 has an inflow path 33 for receiving a part of the exhaust gas flowing in the exhaust passage 15 for scavenging and a scavenging-flow forming means 36 for making the received exhaust gas an exhaust gas flow suitable for scavenging.

Figure 2:
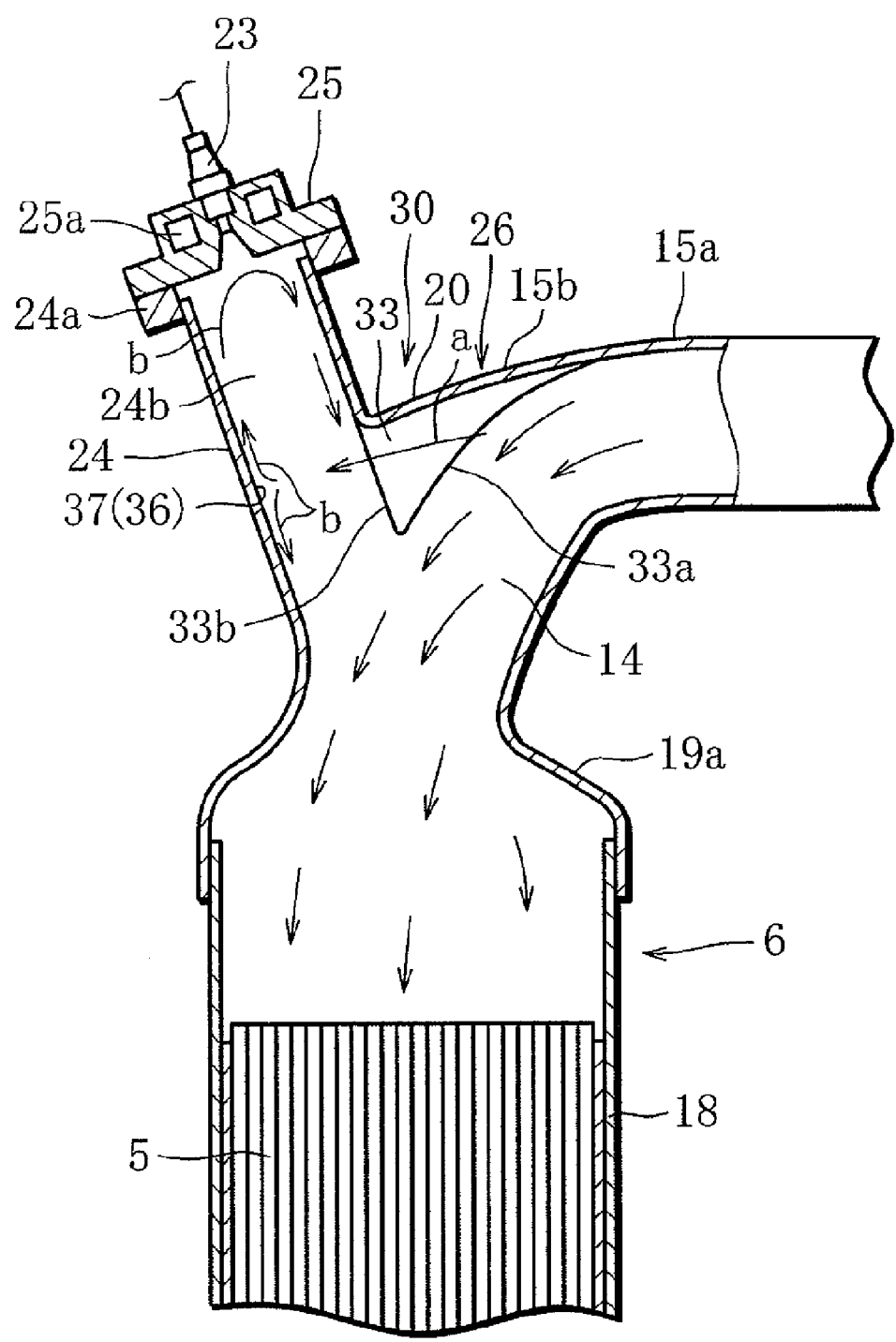
FIG. 2 is a side sectional view for explaining a scavenging state of a fuel injection path.
Figure 3:
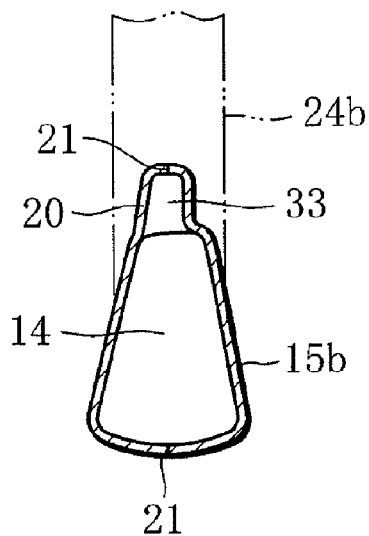
FIG. 3 is a sectional view on arrow along A-A line in FIG. 1.
Figure 4:
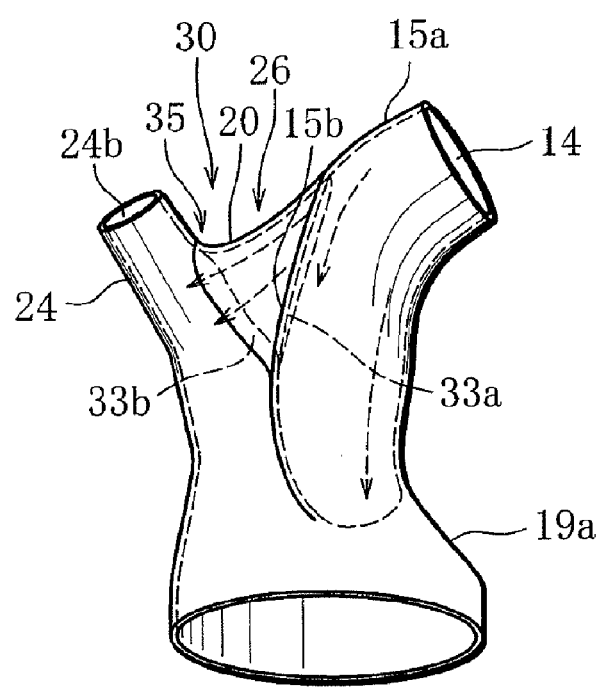
FIG. 4 is a perspective view illustrating an essential part of FIG. 1.
Figure 5:
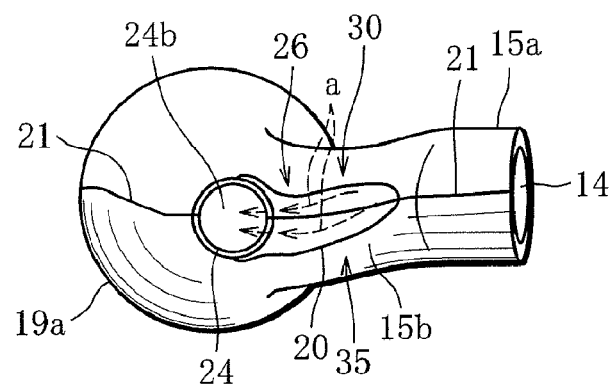
FIG. 5 is a plan view similarly illustrating the essential part of FIG. 1.

Specifically, the inflow path 33 is constructed such that, as shown in FIGS. 2 to 5, an upper wall of a fork portion 35 from a base end portion of the cylindrical portion 24 to the portion 15b (pipe portion on the outlet side of the bent portion 15a) in the exhaust passage crossing at an acute angle immediately upstream of the base end portion is expanded outward and only the exhaust passage 15 above the fork portion 35 is locally expanded. Reference numeral 20 in FIGS. 1 to 3 denotes a wall portion expanded as above. The inflow path 33 is formed in a flow-passage section considerably narrowed from the flow-passage section of the bent portion 15a as shown in FIGS. 3 and 5. Thereby, the inflow portion 33 takes in a part of the exhaust gas from an inlet 33a opened in the portion 15b so that the exhaust gas is introduced from an outlet 33b opened in the base end portion of the cylindrical portion 24 to the fuel injection path 24b. In order to make the inflow path 33 formed easily, a half-divided structure to have a divided face 21 at the center in the width direction of the inflow path 33 is employed in the inlet body 19a as shown in FIG. 5.

The scavenging-flow forming means 36 uses a structure in which a collision portion 37 colliding against which the exhaust gas guided out of the inflow path 33 collides is formed on a wall surface of the fuel injection path 24b as shown in FIG. 2. Specifically, the collision portion 37 is a wall surface portion facing the outlet 33b in the wall surfaces of the fuel injection path 24b. Thereby, a collision flow of the exhaust gas colliding against the collision portion 37 flows along the wall surface of the fuel injection path 24 into its depth. By the inflow of the collision flow, the exhaust gas circulates in the fuel injection path 24, and an evaporated fuel and soot in the fuel injection path 24 is pushed out.

The fuel injected from the fuel addition valve 23 is used for generating a reducing agent by reaction of the oxidation catalyst 5, to reduce and remove NOx and SOx stored in the NOx trap catalyst 8 by the reducing agent, and to burn and remove the PM trapped by the particulate filter 11 by heat obtained similarly by the reaction of the oxidation catalyst 5. Thus, the fuel addition valve 23 is configured to inject a fuel when a catalyst reaction such as reduction and removal of NOx and SOx or combustion and removal of PM is required during operation of the diesel engine by a control portion controlling the diesel engine such as an ECU (not shown), for example.

Next, an action of the exhaust gas purification device 3 configured as above will be explained.

During operation of the diesel engine, an exhaust gas exhausted from the diesel engine is, as shown in FIG. 1, exhausted to the outside through the exhaust manifold 1a, the turbo charger 2, the bent portion 15a, the oxidation catalyst 5, the NOx trap catalyst 8, and the particulate filter 11.

The NOx contained in the exhaust gas is stored in the NOx trap catalyst 8, and the PM is similarly trapped by the particulate filter 11.

Suppose that a timing to remove the stored NOx, SOx and trapped PM has come and the fuel addition valve 23 is operated.

Then, from the fuel injection portion of the fuel addition valve 23, a fuel for removing NOx, SOx, and PM is injected toward the inlet end face of the oxidation catalyst 5 for a predetermined time through the fuel injection path 24b as shown in FIG. 1. Thereby, a reducing agent is generated, the NOx and SOx stored in the NOx trap catalyst 8 is reduced and removed by the reducing agent, and by heat obtained by reaction of the oxidation catalyst 5, the PM trapped by the particulate filter 11 is combusted and removed.

At this time, a part of the exhaust gas is continuously guided to the fuel injection path 24b through the inflow path 33 from the bent portion 15a as shown by an arrow a in FIGS. 2, 4, and 5. The exhaust gas collides against the collision portion 37 in the fuel injection path 24b. The collision flow generated at the collision flows along the wall surface of the fuel injection path 24b as shown by an arrow b into the depth.

Then, as shown in FIG. 2, the exhaust gas turns at the end terminal of the fuel injection path 24b and returns and circulates in the fuel injection path 24b so as to scavenge the inside of the fuel injection path 24b. By this scavenging, the evaporated fuel and soot in the fuel injection path 24b, that is, a substance to cause generation of a deposit and the like is pushed out of the fuel injection path 24b.

Therefore, the evaporated fuel or soot does not accumulate in the fuel injection path 24 any more, and generation of the deposit in the fuel injection path 24b is suppressed. As a result, the fuel addition valve 23 can inject fuel favorably all the time, and the exhaust gas purification performance can be maintained favorably all the time.

Moreover, the structure in which the inflow path 33 is formed by expansion at the merging portion 26 and the exhaust gas guided out by the inflow path 33 is changed to a flow suitable for scavenging is simple. Still more, the collision-type scavenging structure can effectively scavenge the evaporated fuel and soot accumulated in the fuel injection path 24b only by having the exhaust gas collided. Particularly, since the fuel injection path 24b and the fuel addition valve 23 are installed at the bent portion 15a, a structure for scavenging inside the fuel injection path 24b utilizing the fork portion 35 formed by the fuel injection path 24b and the portion 15 can be constructed easily.

FIGS. 6 to 9 illustrate a second embodiment of the present invention.

In this embodiment, the fuel injection path 24b is scavenged using another swirl-type inflow portion 40 separate from the collision-type scavenging portion in the first embodiment.

Figure 8:
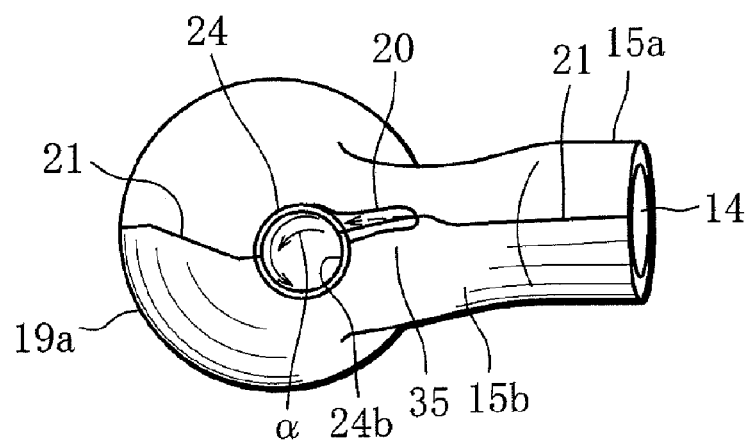
FIG. 8 is a plan view similarly illustrating the essential part of FIG. 6.
Figure 9:
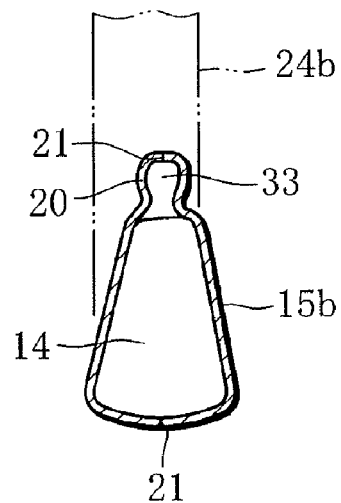
FIG. 9 is a sectional view on arrow along B-B line in FIG. 7.

Specifically, an inflow portion 40 of the present embodiment has the outlet 33b of the inflow portion 33 opened at a point offset to the side from the center of the fuel injection path 24b, more specifically, a point in a tangent direction of the fuel injection path 24b as the scavenging-flow forming means 36 as shown in FIGS. 8 and 9 so that the exhaust gas is introduced into the fuel injection path 24b along the circumference from the downstream side of the fuel injection path 24.

Figure 6:
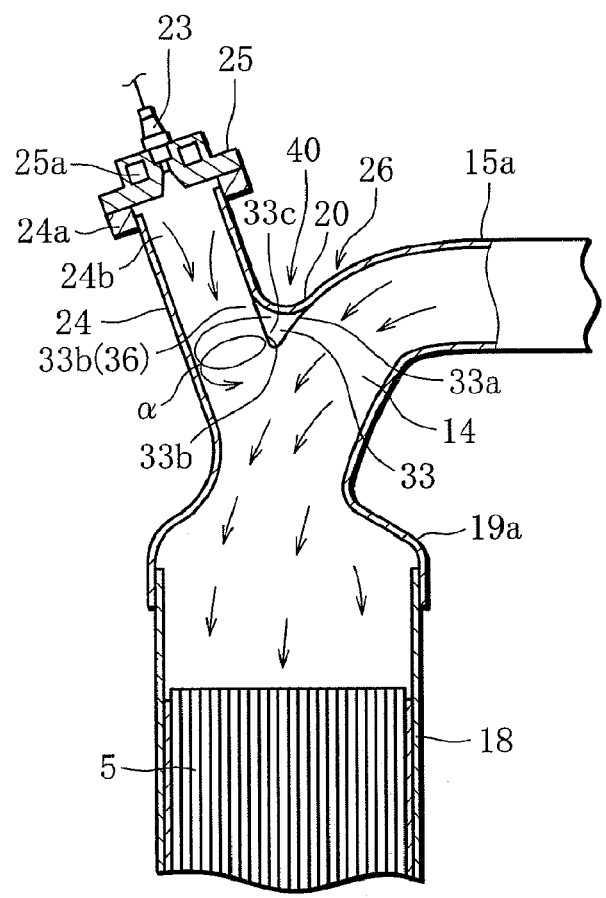
FIG. 6 is a sectional view illustrating an exhaust gas purification device according to a second embodiment of the present invention.
Figure 7:
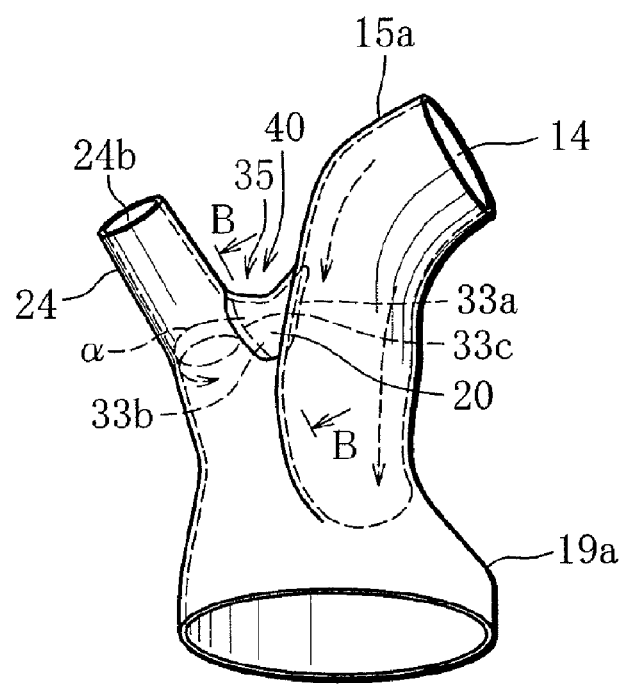
FIG. 7 is a perspective view illustrating the essential part in FIG. 6.

By the introduction of the exhaust gas, a swirl flow α is generated in the fuel injection path 24b as shown in FIGS. 6 to 8, and the evaporated fuel and soot accumulated in the fuel injection path 24b is sucked out by a negative pressure generated at the center part of the swirl flow α. With regard to the sucking out, since a higher sucking-out performance is ensured when a flow velocity of the swirl flow α is higher, as shown in FIG. 7, a throttle portion 33c is formed on the outlet side of the inflow path 33.

The evaporated fuel and soot can be effectively made to flow out of the fuel injection path also by the sucking-out by the swirl flow as above, and the same effect as that in the first embodiment can be obtained. The swirl flow type also has a simple structure.

In FIGS. 6 to 9, the same reference numerals are given to the same portions as those in the first embodiment and the description is omitted.

Figure 10:
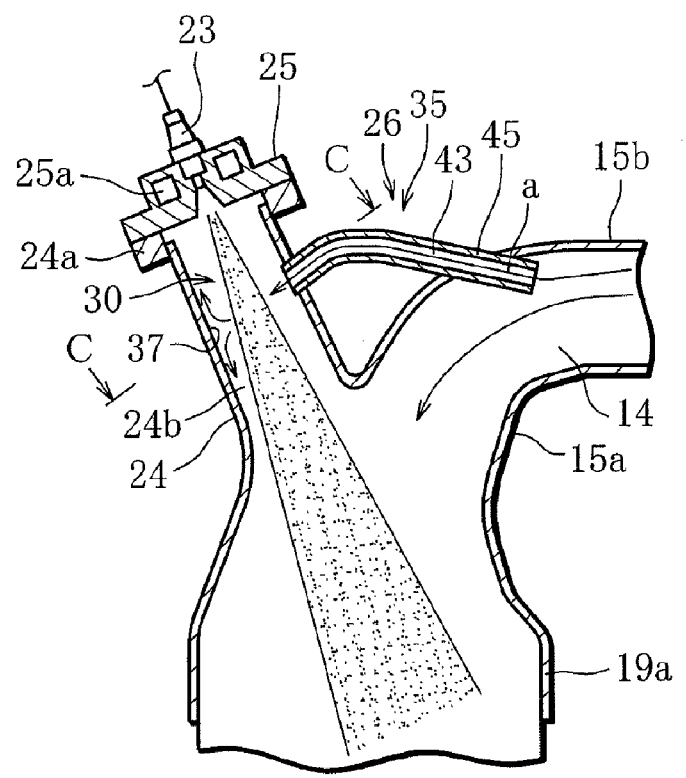
FIG. 10 is a sectional view illustrating an exhaust gas purification device according to a third embodiment of the present invention.
Figure 11:
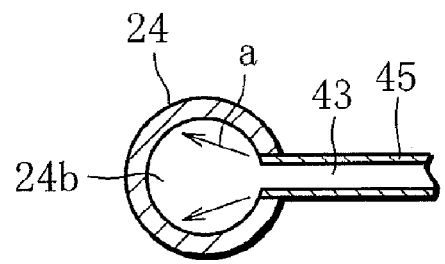
FIG. 11 is a sectional view on arrow along C-C line in FIG. 10.

FIGS. 10 and 11 illustrate a third embodiment of the present invention.

The present embodiment employs an inflow path 43 in a separate structure, not the inflow path 33 in an integral structure as in the first embodiment.

Specifically, the inflow path 43 has one end portion of an exhaust gas introduction pipe member 45 constituted by a pipe member communicating with a point on the downstream side of the fuel injection path 24b and the other end portion communicating with a portion 15b in the exhaust passage 15 immediately upstream from the fuel injection path 24b and is formed by connecting the both to each other by an exhaust gas introduction pipe portion 45. The scavenging structure can be also constructed easily with this structure.

The exhaust gas flowing from the inflow path 43 into the fuel injection path 24b collides against the collision portion 37 on the wall surface of the fuel injection path 24b similarly to the scavenging-flow forming means 36 in the first embodiment so as to push out the evaporated fuel and soot of the fuel injection path 24b. Thus, in FIGS. 10 and 11, the same reference numerals are given to the same portions as those in the first embodiment and the description is omitted.

Figure 12:
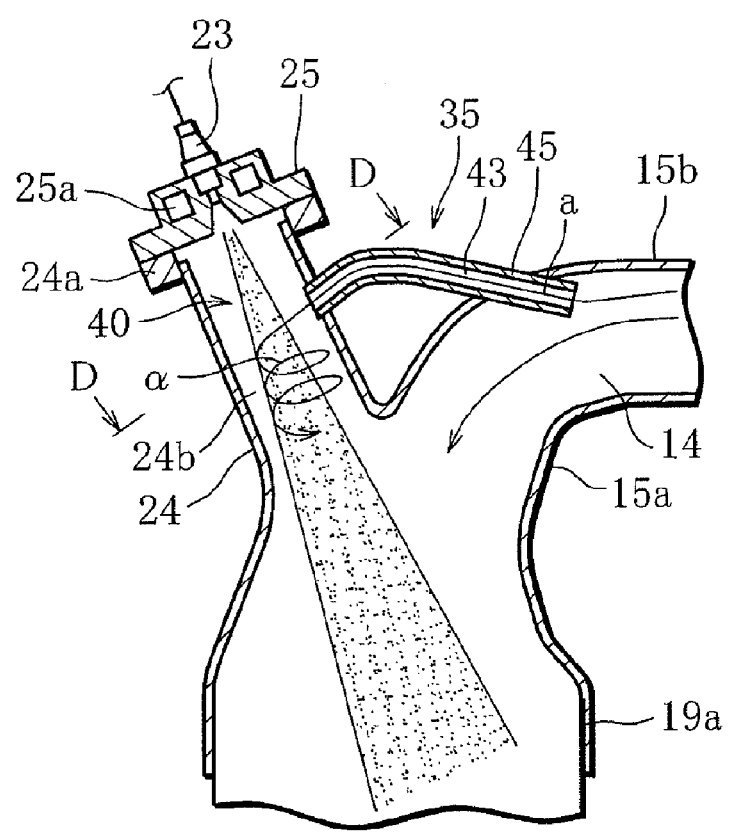
FIG. 12 is a sectional view illustrating an exhaust gas purification device according to a fourth embodiment of the present invention.
Figure 13:
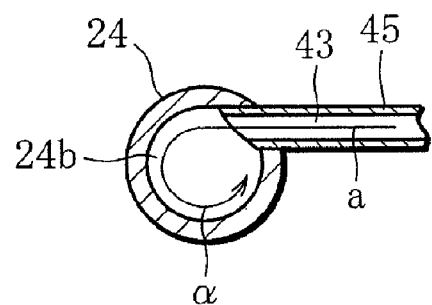
FIG. 13 is a sectional view on arrow along D-D line in FIG. 12.

FIGS. 12 and 13 illustrate a fourth embodiment of the present invention.

In the present embodiment, the inflow path 43 in the separate structure cited in the third embodiment is applied to the swirl-flow type inflow portion 40 cited in the second embodiment.

Specifically, one end portion of the exhaust gas introduction pipe member 45 constituted by the pipe member is made to communicate with the fuel injection path 24b from the tangent direction. That is, the one end portion of the introduction pipe member 45 is made to communicate with a position offset from the centerline of the injection path 24b. Moreover, the end portion is inclined to the downstream side of the injection path 24b. Also, the other end portion is made to communicate with the exhaust passage portion 15b immediately upstream from the injection path 24b so that the exhaust gas introduced from the exhaust gas introduction pipe portion 45 into the injection path 24b flows downstream while swirling. With this structure, the scavenging structure can be also constructed easily.

In FIGS. 12 and 13, the same reference numerals are given to the same portions as those in the second embodiment and the description is omitted.

Figure 14:
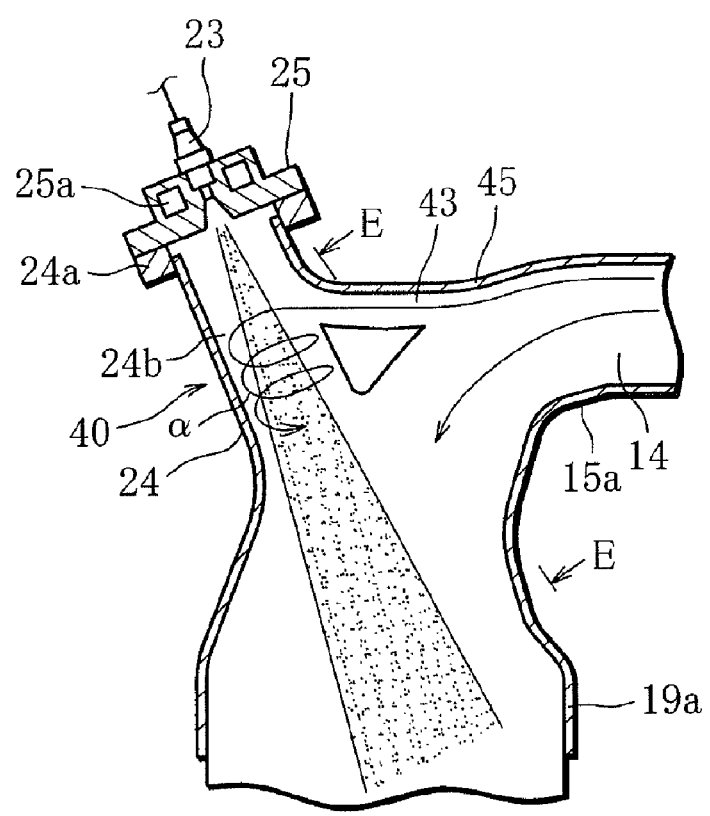
FIG. 14 is a sectional view illustrating an exhaust gas purification device according to a fifth embodiment of the present invention.
Figure 15:
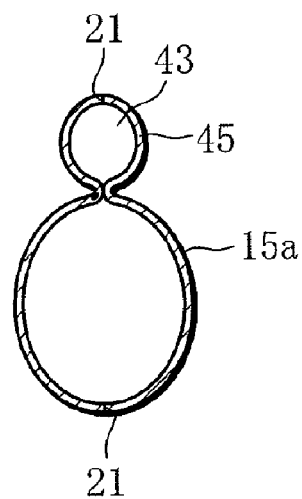
FIG. 15 is a sectional view along E-E line in FIG. 14.

FIGS. 14 and 15 illustrate a fifth embodiment of the present invention.

The present embodiment is a variation of the fourth embodiment and has the exhaust gas introduction pipe portion 45 formed by the pipe member in the fourth embodiment molded integrally with the bent portion 15a of the exhaust passage 15 and the cylindrical portion 24 of the injection path 24b.

In FIGS. 14 and 15, the same reference numerals are given to the same portions as those in the fourth embodiment and the description is omitted.

Figure 16:
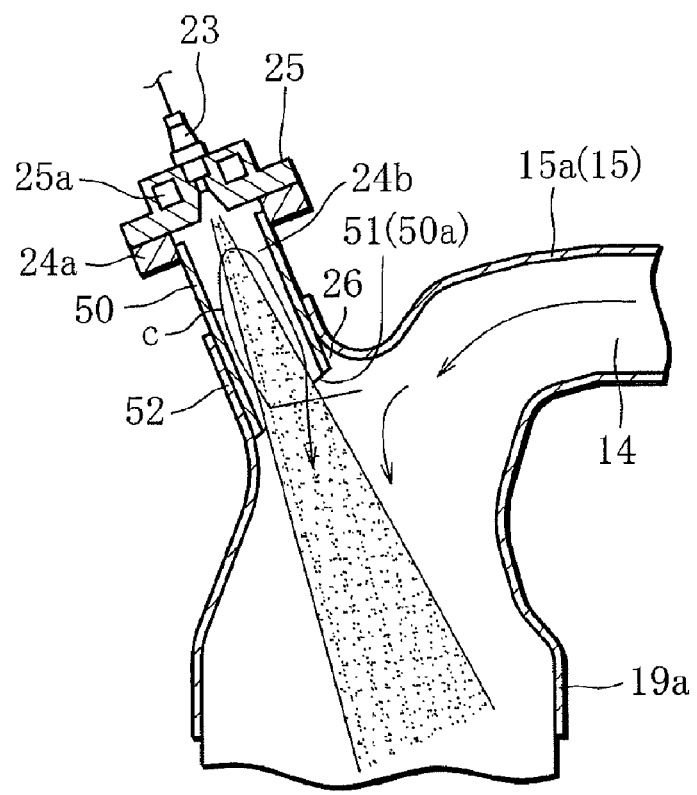
FIG. 16 is a sectional view illustrating an exhaust gas purification device according to a sixth embodiment of the present invention.
Figure 17:
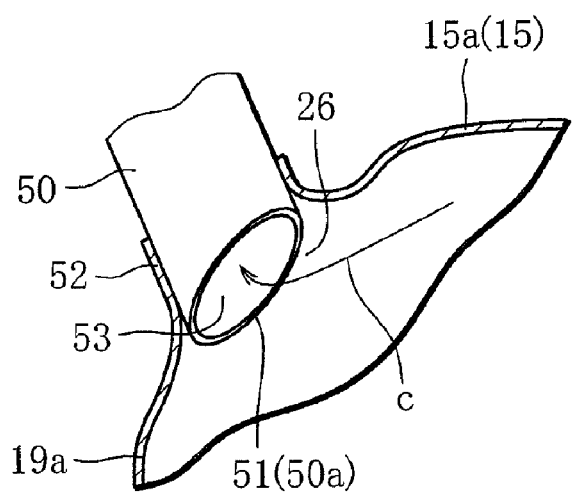
FIG. 17 is a perspective view illustrating an essential part of FIG. 16.

FIGS. 16 and 17 illustrate a sixth embodiment of the present invention.

The present embodiment is different from the first to fifth embodiments and has a structure in which the fuel injection path 24b is constituted by using a pipe member 50 separate from a member forming the exhaust passage 15 and a part of the exhaust gas from the bent portion 15a is introduced into the fuel injection path 24b.

Specifically, the pipe member 50 has a notched portion 50a formed at the distal end portion for receiving a part of the exhaust gas flowing in the exhaust gas passage, and the fuel addition valve 23 is installed at the rear end portion. At the notched portion 50a, a diagonal portion 51 in which a distal end portion of the pipe member 50 is notched diagonally as shown in FIGS. 16 and 17 is formed. The pipe member 50 is inserted and mounted from a port portion 52 for insertion formed on the outlet side of the bent portion 15a, and an opening of the diagonal notched portion 51 formed at the distal end is arranged toward the upstream side of the exhaust passage 15 and the opening becomes an introduction port 53 for receiving the exhaust gas. The diagonal notched portion 51 at the distal end of the pipe member 50 is arranged so as to project into the bent portion 15a and forms the merging portion 26 with the exhaust passage 15.

According to this structure, a part of the exhaust gas flowing in the bent portion 15a of the exhaust passage 15 as shown by an arrow c in FIGS. 16 and 17 flows into the fuel injection path 24b formed by the pipe member 50 from the introduction port 53 and scavenges the inside of the fuel injection path 24b. By the scavenging, substances causing generation of deposits and the like such as the evaporated fuel and soot accumulated in the fuel injection path 24b are pushed out into the exhaust passage 15.

Thus, similarly to the first and third embodiments, generation of the deposits can be suppressed with the simple structure. Particularly, with the pipe member 50 employing the diagonal notched portion 51, by changing the projecting amount of the distal end or by changing a notched angle of the diagonal notched portion 51, an exhaust gas amount to be introduced can be adjusted and can be easily adapted to an engine with a different specification such as a displacement.

In FIGS. 16 and 17, the same reference numerals are given to the same portion as those in the first embodiment and the description is omitted.

FIGS. 18 to 20B illustrate a seventh embodiment of the present invention.

Figure 18:
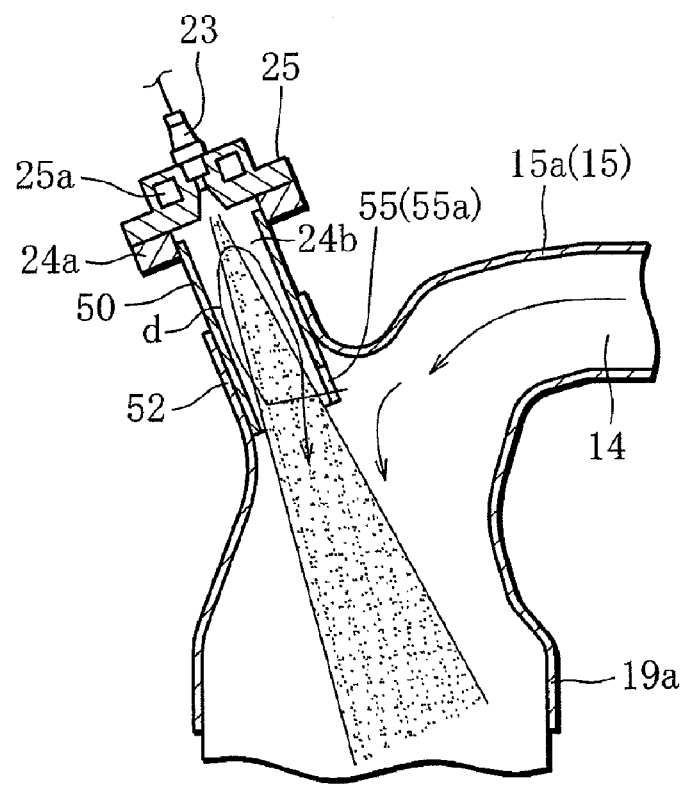
FIG. 18 is a sectional view illustrating an exhaust gas purification device according to a seventh embodiment of the present invention.
Figure 19:
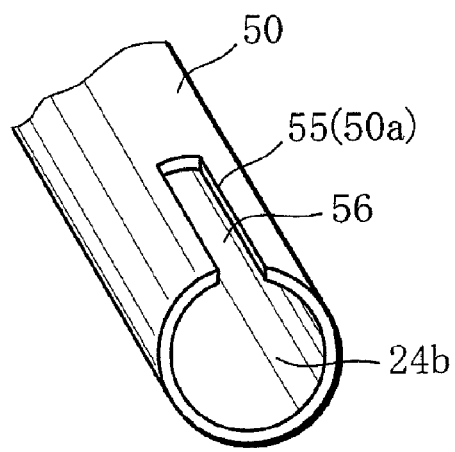
FIG. 19 is a perspective view illustrating an essential part of FIG. 18.

The present embodiment has a notched portion formed by a slit 55 extending in an axial direction of the pipe member 50 as shown in FIG. 19, not as the diagonal notched portion 51 cited in the sixth embodiment. That is, an opening of the slit 55 is made as an introduction port 56 for receiving a part of the exhaust gas flowing in the exhaust passage 15. The introduction port 56 is arranged opposing the exhaust gas flow as shown in FIG. 18. The slit 55 is arranged so as to project into the bent portion 15a and forms the merging portion 26 with the exhaust passage 15.

Figure 20A:
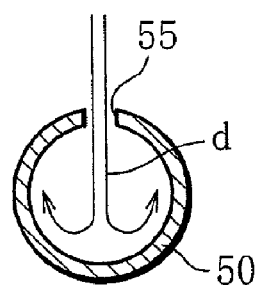
FIG. 20A is a lateral sectional view illustrating a flow of an exhaust gas in a fuel injection path 24b in FIG. 18.
Figure 20B:
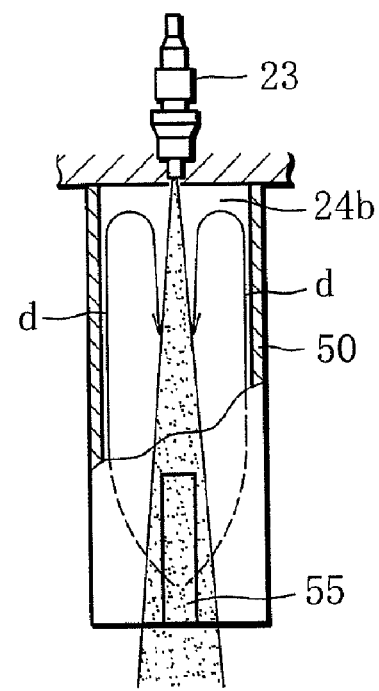
FIG. 20B is a vertical sectional view illustrating a flow of an exhaust gas in the fuel injection path 24b in FIG. 18.

With this structure, a part of the exhaust gas flowing in the bent portion 15a of the exhaust passage 15 flows into the fuel injection path 24b formed by the pipe member 50 from the introduction port 56 formed by the slit 55 as shown by an arrow d in FIGS. 18, 20A, and 20B and scavenges the inside of the fuel injection path 24b. By the scavenging, the evaporated fuel and soot accumulated in the fuel injection path 24b is pushed out into the exhaust passage 15.

Thus, similarly to the sixth embodiment, the generation of the deposits can be suppressed with the simple structure. Moreover, by changing the projecting amount of the distal end or by changing the width dimension of the slit in the pipe member 50 employing the slit 55, the exhaust gas amount to be introduced can be adjusted and easily adapted to an engine with a different specification such as a displacement.

Figure 21A:
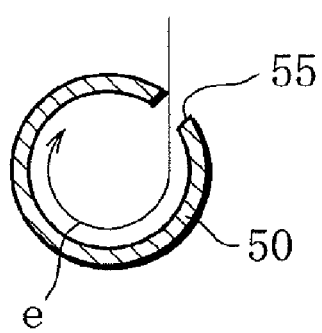
FIG. 21A is a lateral sectional view illustrating a flow of an exhaust gas in the fuel injection path 24b in a variation.
Figure 21B:
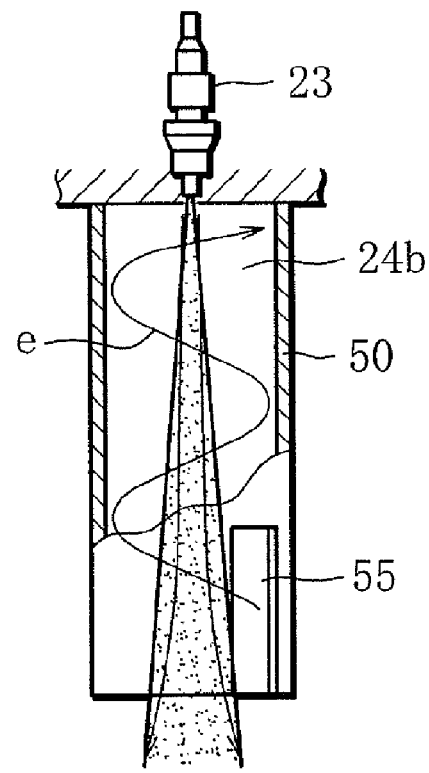
FIG. 21B is a vertical sectional view illustrating a flow of an exhaust gas in the fuel injection path 24b in the variation.

Also, as shown in a variation in FIGS. 21A and 21B, if the orientation of the slit 55 is positioned not on the front of the exhaust gas flow but with offset in a lateral direction, as shown by an arrow e in FIGS. 21A and 21B, a part of the exhaust gas in the bent portion 15a is introduced into the fuel injection path 24b while swirling from the introduction port 56 formed by the slit 55, and the evaporated fuel and soot accumulated in the fuel injection path 24b can be sucked out by a negative pressure generated at the center part of the swirl flow. Thus, the structure with the slit 55 formed has an advantage that scavenging using a collision flow and scavenging using a swirl flow can be used selectively according to the specification.

In FIGS. 18 to 21B, the same reference numerals are given to the same portions as those in the sixth embodiment and the description is omitted.

The present invention is not limited to any of the above-mentioned embodiments but capable of various changes in a range not departing from the gist of the present invention. For example, in the above-mentioned embodiment, the present invention is applied to an exhaust gas purification device in which a fuel addition valve is provided on an outer circumference side of a bent portion of an exhaust gas passage, but not limited to that, the present invention may be applied to an exhaust gas purification device in which the fuel addition valve is provided on an inner circumference side of the bent portion. It is needless to say that the present invention may be applied not to an exhaust gas purification device having an exhaust passage with a bent portion as in the above-mentioned embodiments but to an exhaust gas purification device having an exhaust passage without a bent portion. Of course, in the above-mentioned embodiments, a case in which the present invention is applied to an exhaust gas purification device in which an oxidation catalyst is used as a catalyst on immediately downstream of the bent portion and a NOx trap catalyst, a particulate filter are provided on its downstream was cited, but not limited to that, the present invention may be applied to other purification types of the exhaust gas purification device such as an exhaust gas purification device in which a NOx trap catalyst is used as a catalyst on immediately downstream of the bent portion, a particulate filter is provided on its downstream and an addition valve is provided on an upstream of the NOx trap catalyst, an exhaust gas purification device in which a NOx trap catalyst is used as a catalyst on immediately downstream of the bent portion, an oxidation catalyst, a particulate filter are provided on its downstream and an addition valve is provided on the upstream of the NOx trap catalyst, or an exhaust gas purification device in which a selective reduction catalyst or a particulate filter is provided immediately downstream of the additive injection valve.

Moreover, in the above-mentioned embodiments, fuel is used as an additive in the description, but the additive may be anything as long as it is supplied to a catalyst, and it may be light oil, gasoline, ethanol, dimethyl ether, natural gas, propane gas, urea, ammonia, hydrogen, carbon oxide and the like as a reducing agent, for example. Also, it may be a substance other than the reducing agent and it may be air, nitrogen, carbon dioxide and the like for cooling the catalyst or air and ceria for promoting combustion and removal of soot trapped by the particulate filter, for example.

What is claimed is:

1. An exhaust gas purification device of internal combustion engine comprising:
    an exhaust passage for guiding an exhaust gas discharged from the engine to outside;
    a catalyst provided in said exhaust passage;
    an injection path having a proximal end portion that extends outward from a part of said exhaust passage, which is located in an upstream of said catalyst;
    an additive injection valve installed in said injection path and supplying an additive to said catalyst through the injection path;
    an inflow path for allowing a part of the exhaust gas flowing in said exhaust passage to enter said injection path, said inflow path being formed by expanding only a wall surface of the exhaust passage of a crotch portion between the proximal end portion of the injection path and a part of the exhaust passage, which is located in the immediate upstream of the proximal end portion; and
    a scavenging-flow forming means for forming the exhaust gas entering said injection path through said inflow path, into a scavenging flow for cleaning the inside of the injection path.

2. The exhaust gas purification device of the internal combustion engine according to claim 1, wherein
    said exhaust passage has a bent portion directing the exhaust gas flow toward an inlet of the catalyst,
    said injection path has a proximal end portion joined to said bent portion so that the injection path extends outward from the bent portion, and
    said inflow path is composed of an outwardly-expanded crotch portion formed between the proximal end portion of the injection path and a curving portion of the exhaust passage immediately upstream of said proximal portion.

3. An exhaust gas purification device of an internal combustion engine, comprising:
    an exhaust passage for guiding an exhaust gas discharged from the engine to outside;

a catalyst provided in said exhaust passage;

an injection path connected to an upstream side of said catalyst in said exhaust passage;

an additive injection valve installed in said injection path and supplying an additive to said catalyst through the injection path;

an inflow path for allowing a part of the exhaust gas flowing in said exhaust passage to enter said injection path; and a scavenging-flow forming means for forming the exhaust gas entering said injection path through said inflow path into a scavenging flow for cleaning the inside of the injection path, wherein said exhaust passage has a bent portion directing the exhaust gas flow toward the inlet of the catalyst, said injection path has a proximal end portion joined to said bent portion so that the injection path extends outward from the bent portion, and said inflow path is composed of an introduction pipe member connected to the injection path at an end and the exhaust passage at the other end to extend across a crotch area between the proximal end portion of the injection path and a curving portion of the exhaust passage immediately upstream of said proximal portion.

4. The exhaust gas purification device of the internal combustion engine according to claim 1, wherein said scavenging-flow forming means includes a collision portion which constitutes part of a wall surface of said injection path and against which the exhaust gas introduced through said inflow path collides, and the flow of the exhaust gas generated by the collision cleans the inside of said injection path.

5. The exhaust gas purification device of the internal combustion engine according to claim 1, wherein said scavenging-flow forming means includes an outlet of the inflow path connected to the injection path, said outlet being oriented not to face the axis of the injection path, to allow the exhaust gas entering through the outlet to form a swirling flow inside the injection path, and said swirling flow cleans the inside of the said injection path.

6. An exhaust gas purification device of an internal combustion engine, comprising:

an exhaust passage for guiding an exhaust gas discharged from the engine to outside;

a catalyst provided in said exhaust passage;

an injection path connected to an upstream side of said catalyst in said exhaust passage;

an additive injection valve installed in said injection path and supplying an additive to said catalyst through the injection path, said injection path including a pipe member separate from said exhaust passage, arranged to project into said exhaust passage, and said pipe member having a projecting end cut in a manner adapted to receive a part of the exhaust gas flowing in said exhaust passage, wherein the part of the exhaust gas entering from the exhaust passage through said cut end is formed into a scavenging flow arriving deep into the pipe member and cleaning the inside of the pipe member, and said cut end has a slit extending in a wall of the pipe member, parallel to the axis of the pipe member, where a part of the exhaust gas flowing in said exhaust passage enters the pipe member through the slit.

7. The exhaust gas purification device of the internal combustion engine according to claim 6, wherein said cut end is an oblique cut end forming an induction port receiving a part of the exhaust gas flowing in said exhaust passage.

* * * * *